May 13, 1969     H. S. SMITH ET AL     3,443,276
APPARATUS FOR MAKING WALLED STRUCTURES OF PLASTIC FOAM
Filed Dec. 15, 1965     Sheet 1 of 4
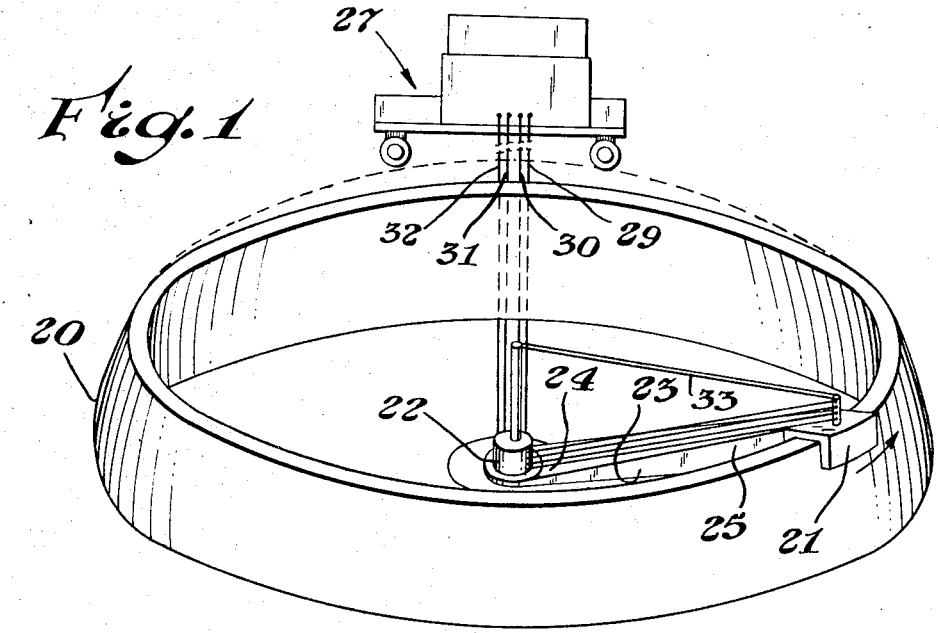
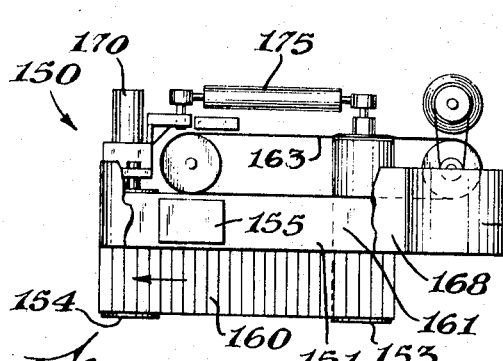
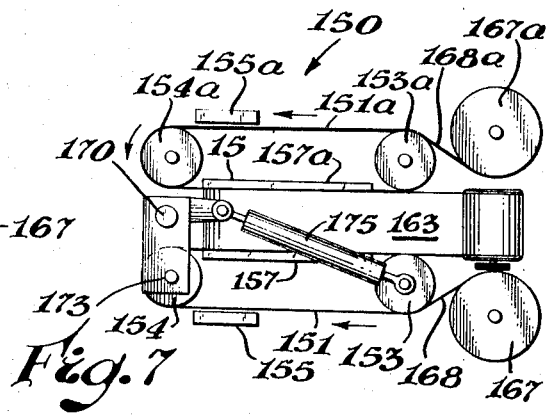
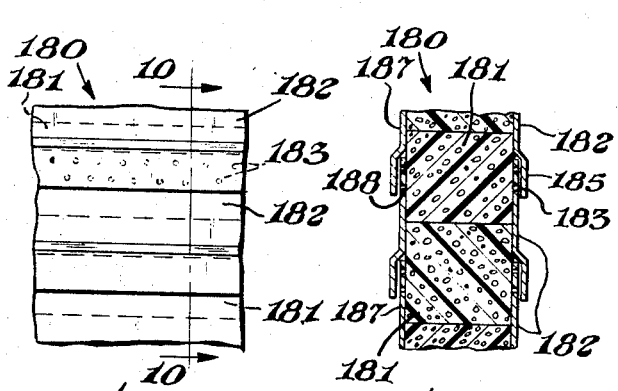
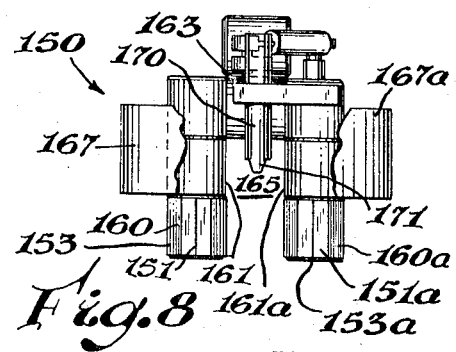
INVENTORS.
Hubert S. Smith,
Donald R. Wright
BY
AGENT INVENTORS.
Hubert S. Smith
Donald R. Wright
BY
AGENT

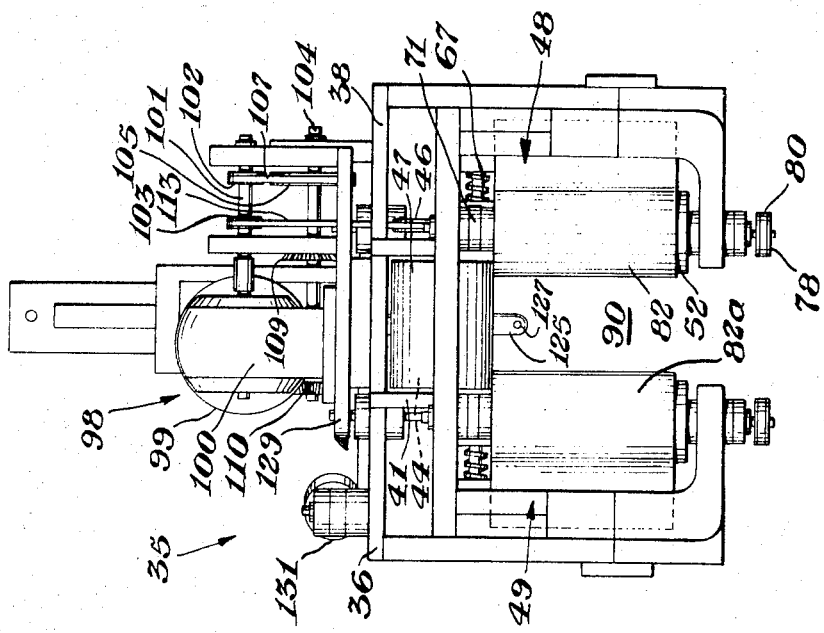
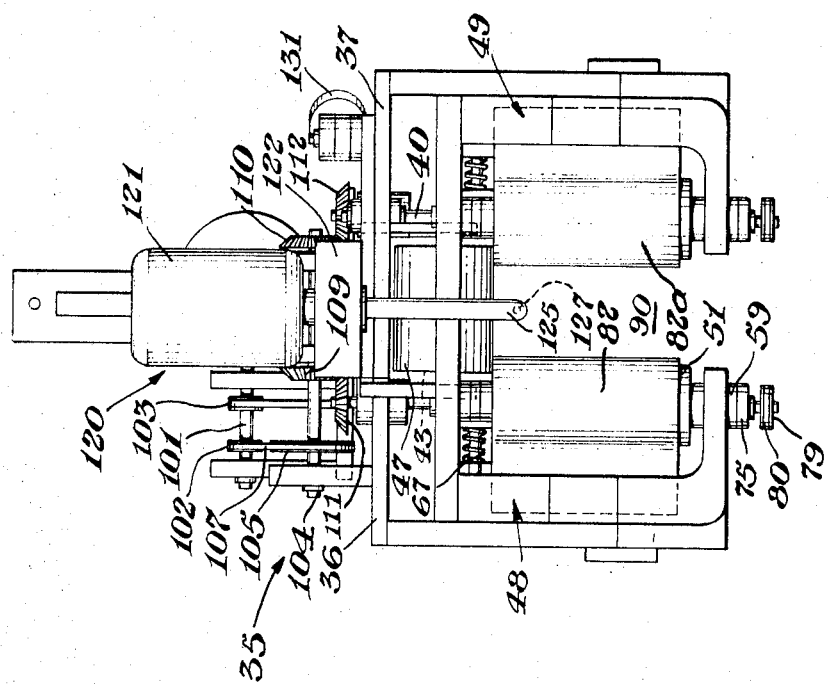
INVENTORS.
Hubert S. Smith
BY Donald R. Wright
AGENT

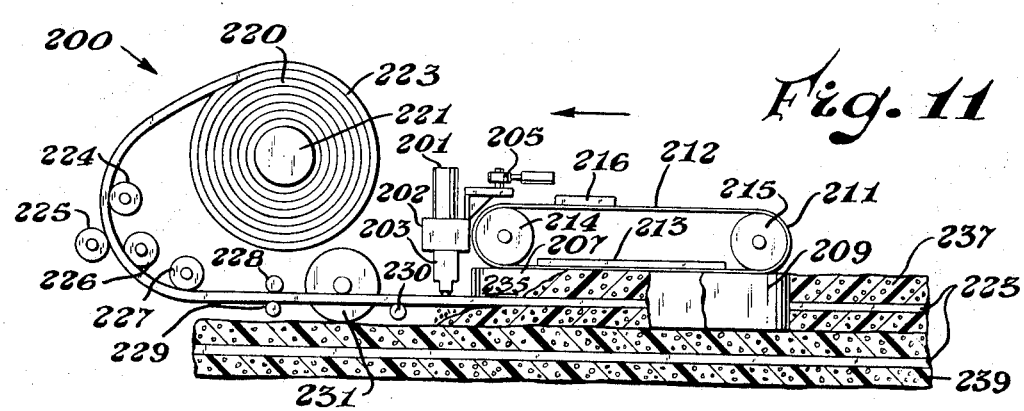
Fig. 11
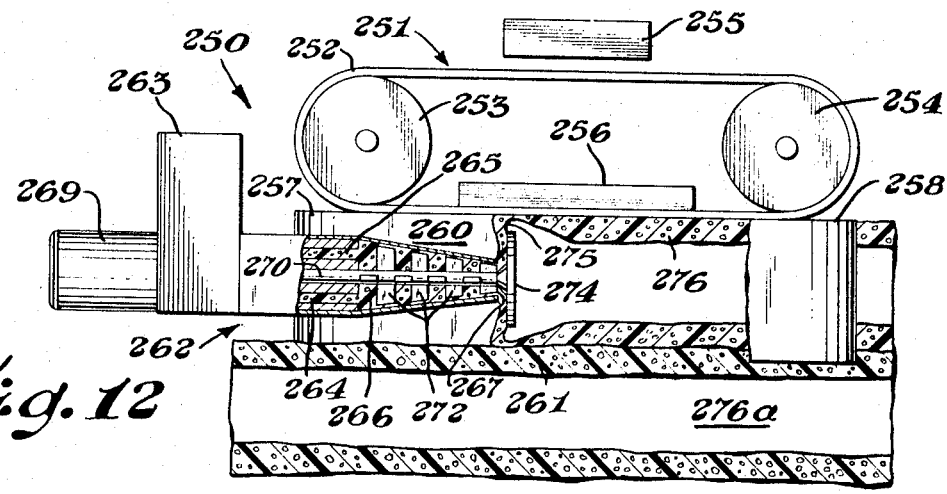
Fig. 12
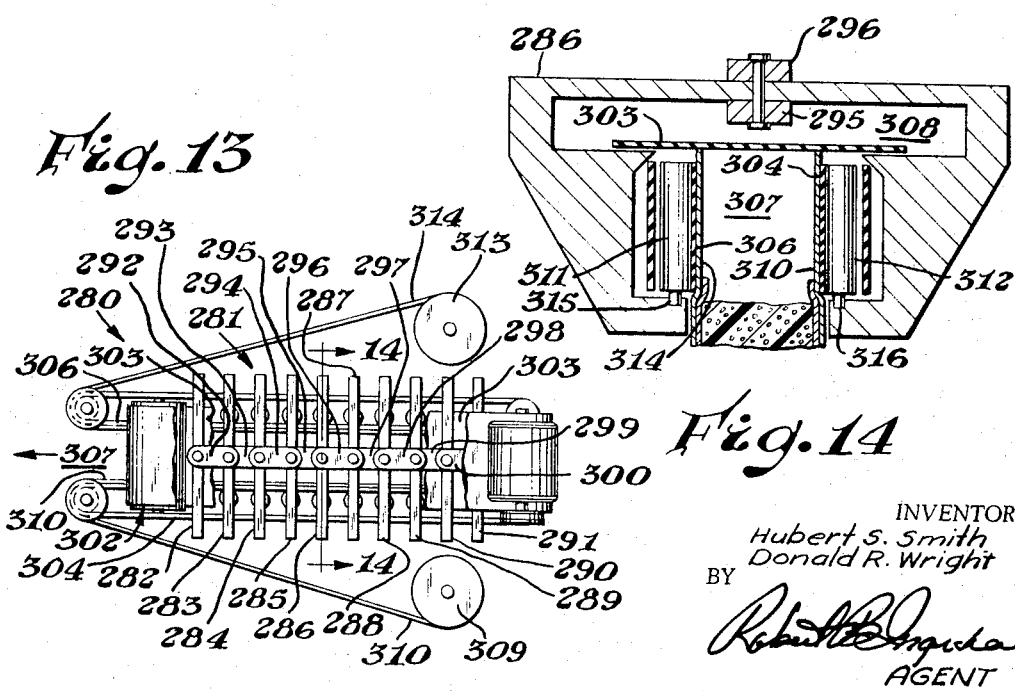
Fig. 13
Fig. 14
INVENTORS.
Hubert S. Smith
Donald R. Wright
BY
AGENT

United States Patent Office 3,443,276
Patented May 13, 1969

3,443,276
APPARATUS FOR MAKING WALLED STRUCTURES OF PLASTIC FOAM
Hubert S. Smith, Essexville, and Donald R. Wright, Midland, Mich., assignors to The Dow Chemical Company, Midland, Mich., a corporation of Delaware
Filed Dec. 15, 1965, Ser. No. 513,998
Int. Cl. B29d 27/04; B29h 7/20
U.S. Cl. 18—5                    8 Claims

ABSTRACT OF THE DISCLOSURE

Walled structures are prepared of foam-in-place plastic material employing a depositing head having a pair of opposed side forming belts on top of the forming belts which are driven at a predetermined rate. Formable material is passed to the channel formed by the belts as the depositing or forming head progresses about the structure.

---

This invention relates to apparatus for making walled structures of plastic foam and more particularly relates to walled structures of plastic foam which are generated incrementally.

United States Patent 3,206,899 discloses a method and apparatus for the preparation of walled structures by a process utilizing thermoplastic foam strips which are spirally or helically disposed in a generally continuous manner and adhered to adjacent strips to form a walled structure. Particulate expandable synthetic resinous thermoplastic materials may also be used to form such structures. The formation of structures from prefoamed components or from particulate expandable plastic materials offers some significant disadvantages. Usually the raw materials from which such structures are prepared must be transported to the building site as foamed elements or as particulate foamable elements which are handled with some difficulty. Further the particulate foamable particle or elements require a relatively high mold pressure which necessitates rather sturdy molds or forming means. The shipment of plastic foam is relatively expensive because of its low bulk density. The handling of particulate expandable material also offers significant difficulty in transportation to the operating of foam laying head of the apparatus and offers substantial disadvantages because of the heating techniques required to obtain satisfactory expansion and bonding together of the expandable particles to form a unitary body. Foamable or expandable particles or prefoamed plastic strips have numerous disadvantages when it is desired to incorporate within the wall of the structure various conduits, reinforcements and the like. Expandable particulate particles are not readily formed into intricate shapes. When employing prefoamed elements, it is costly to use a strip that deviates appreciably from a rectangular cross section.

It would be particularly advantageous and beneficial if there were available an apparatus which would permit the formation of walled structures from reactive liquid foam-producing plastic resin materials. By the term reactive liquid foam-producing plastic resin material is meant any material which can be handled as a liquid and subsequently cured to form a foam plastic body.

The apparatus of the present invention can be applied to many reactive foam-producing materials such as chloromethylated diphenyloxide, epoxy resin compositions, urethane compositions, polyesters, phenol formaldehydes and the like. The different raw materials require different reaction activation techniques. However, the general principle is essentially the same. For example, the chloromethylated diphenyl oxide requires heat activation while the urethanes require intimate mixing of two reactant materials prior to the form of the polymerized plastic foam.

It is object of this invention to provide an improved apparatus for the preparation of walled structures from liquid plastic foam-producing components.

It is a further object of this invention to provide an apparatus for the production of a walled structure having controlled voids within the walls.

A further object of the invention is to provide an improved apparatus for the preparation of a foam structure having a reinforcement layer at the surface thereof.

A further object of the invention is to provide an apparatus which is capable of installing a conduit or service line within such a walled structure.

A further object of the invention is to provide an apparatus capable of preparing structures by the spiral generation technique having a relatively small diameter.

These benefits and other advantages in accordance with the present invention are achieved in an apparatus for the formation of a walled structure by a spiral generating technique which comprises in operative cooperation an operating head support so constructed and arranged so as to position an operating head at a desired location and to successively deposit a synthetic resinous foam material to form a walled structure, the improvement which comprises an operating head comprising a frame, the frame having a top belt, a first side belt and a second side belt, each of the belts being an endless belt, means to drive the belts at a substantially equal speed, the operating head having a first or front end and a second or rear end, the belts adapted to engage a portion of a foamed structure and propel the operating head in a forward direction, the top belt and first and second side belts defining a channel therebetween, the distance between the side belts being substantially equal to the desired wall thickness of the structure, means to provide a foamable hardenable synthetic resinous material within the channel formed by the belts.

Further features and advantages of the present invention will become more apparent from the following specification taken in connection with the drawing wherein:

FIGURE 1 is a schematic illustration of the apparatus of the invention;

FIGURE 4 is a front end view of the apparatus of FIGURE 2;

FIGURE 5 is a rear end view of the apparatus of FIGURE 2;

FIGURE 6 is a schematic side view of an alternate embodiment of a material depositing head in accordance with the invention;

FIGURE 7 is a top view of the apparatus of FIGURE 6;

FIGURE 8 is a front view of the apparatus of FIGURE 6;

FIGURE 9 is a fractional view of the surface of a structure generated employing a material depositing head in accordance with the invention;

FIGURE 10 is a sectional view of the wall portion of FIGURE 9 taken along the line 10—10 thereof;

FIGURE 11 is a schematic side view of an alternate material depositing head in accordance with the invention;

FIGURE 12 depicts a material depositing head in accordance with the invention for the preparation of hollow walls;

FIGURE 13 is a schematic top view of a material depositing head in accordance with the invention having an articulated body; and FIGURE 14 is a schematic presentation of a portion of the apparatus of FIGURE 13 taken along the line 14—14 of FIGURE 13.

Figure 3:
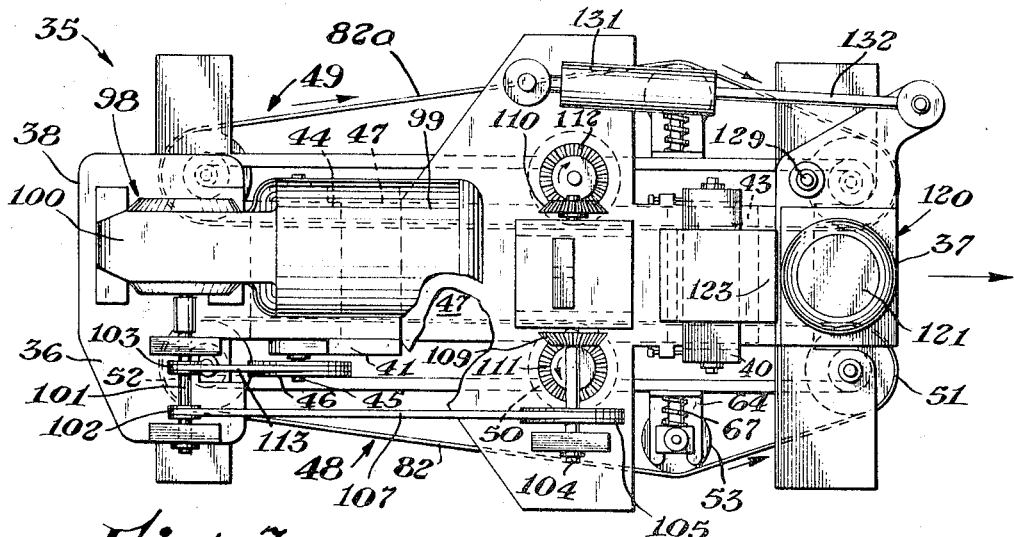
FIGURE 3 is a top view of the apparatus of FIGURE 2.

In FIGURE 1 there is schematically represented a structure 20 being fabricated employing apparatus in accordance with the present invention. An operating head 21 is spirally depositing a synthetic resinous foaming material to form the structure 20. The foam depositing head 21 is moving in the direction indicated by the arrow. A pivot 22 is centrally disposed within the structure 20. The pivot 22 has affixed thereto an arm or boom 23 having a first end 24 pivoted to the pivot 22 in such a manner that the boom 23 may describe a varying solid angle. The arm 23 has a second end 25 which is pivotally affixed to the material depositing head 21. A mobile power and material source 27 is remotely disposed from the structure 20. A plurality of lines 29, 30, 31 and 32 provides communication between the power and material source 27 and the foam depositing head 21. An elevating means 33 adjustably positions the head 21 or eye of the boom 25 in a vertical direction. Alternately the supply means may be located at any convenient point such as at the pivot 22.

In operation of the apparatus represented in FIGURE 1, power and foamable material are supplied from the power and material source 27 though the lines 29, 30, 31 and 32 through rotary joints (not shown) in the pivot 22. The operating head is so constructed and arranged so as to grip the existing portion of the structure 20 and propel itself in the direction indicated by the arrow while simultaneously depositing a quantity of a hardenable foamable material which adheres to the existing structure 20 and increase its height by a predetermined amount generally in the manner of the addition of a foam strip in accordance with United States Patent 3,206,899.

In FIGURES 2, 3, 4 and 5 there is schematically depicted a foam depositing head in accordance with the present invention generally designated by the reference numeral 35. The foam depositing head 35 comprises in cooperative combination a frame assembly 36, the frame 36 having a first end 37 and a second end 38. The frame assembly 36 defines a first top belt support 40 and a second top belt support 41. The first top belt support 40 has rotatably journaled therein a first top belt drum 43. The second top belt support has rotatably journaled therein a second top belt drum 44. The second top belt support drum 44 has a projecting stub shaft 45. A drive pulley 46 is rigidly affixed to the shaft 45. A top forming belt 47 is supported by the drums 43 and 44. Affixed to the frame 36 is a first side belt assembly 48 and a second side belt assembly 49. The first and second side belt assemblies 48 and 49 are substantially identical and are mirror images of each other. The first side belt assembly 48 affixed to the frame 36 comprises a first roll or drum 50, a second belt roll 51, and a third or rear side belt roll 52. The roll 50 is rotatably affixed to the frame 36 by means of a shaft 54 passing through a suitable bearing not shown. A dancer roll 53 is disposed generally adjacent the first roll 50. A bearing arm 56 is disposed generally remote from the frame and between the remote terminal portions of the rolls 50 and 51 and is rotatably affixed to the roll 50 by means of the bearing 58 and to the roll 51 by means of the bearing 59. A second bearing arm 60 is disposed generally between the rolls 50 and 51 and is secured to the roll 50 by the bearing 61 and to the roll 51 by the bearing 62. The bearing arms 56 and 60 have disposed thereon a dancer roll support assembly 64 affixed to the arm 60 and a support assembly 65 affixed to the arm 56 respectively. The assemblies 64 and 65 outwardly tension the dancer roll by means of the compression spring 67. A linkage arm 70 having a first end bearing 71 in engagement with the roll 52 and a second end bearing 72 in engagement with the roll 50 in combination with a linkage arm 74 having an end bearing 75 in engagement with the roll 52 and a second end 76 in engagement with the roll 50 serve to space the rolls 50 and 52 and maintain them in generally parallel relationship to each other, whereas the arms 56 and 60 maintain the rolls 51 and 50 in spaced parallel arrangement. A drive pulley 78 is rigidly affixed to the roll 52. A drive pulley 79 is rigidly affixed to the shaft 54 of the roll 50. The pulleys 79 and 78 are connected by a drive belt which causes the rolls 50 and 52 to rotate at identical speeds. A first side belt 82 is in operative engagement with the drums 50, 51, 52 and 53. A similar side belt designated by the suffix a is disposed on the second side belt assembly. A plurality of belt heaters 84, 85, 86 and 87 are in operative engagement with the surface of the side belt 82 adjacent the central portion of the frame 36. The belts 82, 82a and 47 define a centrally disposed channel 90. A belt drive mechanism 98 is supported by the frame 36. The belt drive mechanism 98 comprises a motor 99, a gear head or transmission 100 having an output shaft 101. Rigidly affixed to the output shaft 101 are first and second drive pulleys 102 and 103. The pulley 102 is in operative engagement with a side belt drive shaft 104 rotatably supported within the frame 36 by means of a side belt drive pulley 105 in operative engagement with the drive pulley 102 by means of a belt 107. A pair of bevel gears 109 and 110 is affixed to the shaft 104. The bevel gears 109 and 110 engage bevel gears 111 and 112 affixed to the rolls 50 and 50a, respectively. A belt 113 transmits motion from the pulley 103 to the pulley 46, causing rotation of the drum or roll 44. The drive means is so constructed and arranged that rotation of the shaft 101 in the direction indicated by the arrow causes motion of the various drums and pulleys in the indicated direction and when the belts are in engagement with a structure being formed, the material depositing head progresses in the indicated direction. The frame 36 supports adjacent its first end 37 a material depositing assembly generally designated by the reference numeral 120. The assembly 120 comprises a mixer motor 121, a mixing chamber 122 containing an agitator not shown. A foamable material source generally designated by the reference numeral 123 is in operative communication with the mixer chamber 122. A resin discharge conduit 125 is in operative communication with the mixing chamber 122. The conduit 125 has a discharge end 127 remotely disposed from the chamber 122. The discharge end 127 is directed to discharge material into the channel 90 defined by the belts 86, 86a and 87. The assembly 120 is pivotally secured to the frame 36 by means of the pivot 129. A reciprocating means or oscillating cylinder 131 having a linear actuator 132 is in operative engagement with the mixing chamber 122 and is so constructed and arranged so as to permit oscillation of the assembly 120 about the pivot 129 causing a stream issuing from the discharge end 127 of the conduit 125 to traverse the channel 90.

The operation of the material depositing head is depicted in FIGURES 2, 3, 4 and 5. The head is suspended from a suitable boom or suitable operating mechanism as depicted in FIGURE 1 by the pivot point 83. The depositing head 35 is placed in engagement with a suitable starter strip. Power is applied to the motor 99 and foamable material supplied to the lines 123. Power is also applied to the motor 121, causing a mixed foamable material to issue from the discharge end 127 of the conduit 125. The oscillating means 131 causes the discharge from the opening 127 to traverse the channel 90. Beneficially for cleaning and test purposes the assembly 120 may be pivoted to remove the conduit 125 entirely from the channel 90 and advantageously the conduit is positioned within the structure being fabricated in order to avoid contamination of the fabricated portion. Rotation of the shaft 101 through the various belts and pulleys causes the side belts 82 and 82a to engage a starter strip and advance the head 35 at a predetermined rate which is sufficient to permit a curing and hardening of the foamable material within the channel 90. Beneficially, heat is applied to the belt heaters 84, 85, 86 and 87 if required. The side belts 82 and 82a are maintained tight by the outward force supplied by the dancer rolls 53 and 53a.

In FIGURES 6, 7 and 8 there is illustrated schematically, cutaway side, top and front end views of an alternate embodiment of the invention generally designated by the reference numeral 150. In the schematic illustration of FIGURES 6, 7 and 8, for the sake of clarity, support frames have been omitted. The material depositing head 150 comprises in operative combination, side belts 151 and 151a supported by side belt support front rolls 153 and 153a, and rear side support belts or rolls 154 and 154a, respectively. The side belt 151 is provided with a side belt heater 155 and the side belt 151a provided with a side belt heater 155a. A pair of side belt support plates 157 and 157a are disposed adjacent the inner surfaces of the belts 151 and 151a, respectively. The belts 151 and 151a are driven in the direction indicated by the arrows by means not shown. Each of the belts 151 and 151a has a structure gripping surface 160 and 160a, respectively, and a foam-forming surface 161 and 161a, respectively. A top belt 163 is disposed generally between and at the upper portion of the belts 151 and 151a. The belts 151, 151a and 163 define a channel 165 therebetween. A reinforcing material supply source or spool 167 is disposed generally adjacent the belt 151 and is adapted to feed a web of a fabric reinforcing material to the belt 151 in such a manner that it follows the foam-forming surface into the channel 165. A second reinforcing material supply source 167a is oppositely disposed and associated with the belt 151a and feeds a reinforcing material over the belt 151a into the channel 165. The unwound reinforcing material is designated by the reference numerals 168 and 168a, respectively. A foamable hardenable resin mixing and dispensing means 170 is disposed generally adjacent the pulleys 156 and 156a at the front end of the dispensing head 170. The dispensing head 170 has a resin discharge nozzle 171 directed inwardly to the channel 165. The head 170 is pivotally affixed to the roll 154 at a location 173 and is in operative communication with an oscillating means 175.

Figure 2:
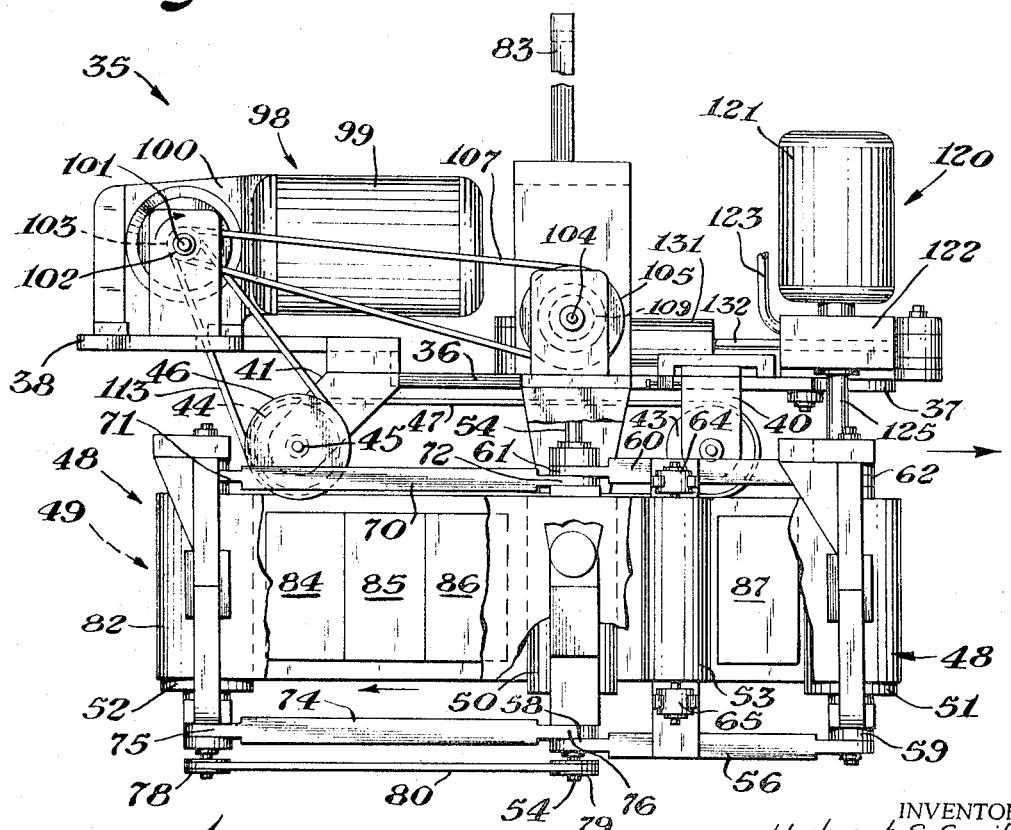
FIGURE 2 is a side view of one embodiment of a foam depositing and forming head in accordance with the present invention.

The operation of the embodiment of the invention set forth in FIGURES 6, 7 and 8 is generally similar to the operation of the embodiment of the invention set forth in FIGURES 2, 3 and 4 with the exception that the side belts are so constructed and arranged so as to have foam structure gripping surfaces 160 and 160a remotely disposed from the top belt 163 so that a more positive drive of the dispensing head against the deformed structure is obtained. Means to provide a continuous reinforcing material is provided in the embodiment of FIGURES 6, 7 and 8 wherein a continuous reinforcing material such as the webs 168 and 168a are disposed on the inner surface of the belts 151 and 151a and the foamable hardenable material securely adheres to the reinforcing material and a structure with a surface other than a hardenable foamed plastic material is obtained.

In FIGURES 9 and 10 are illustrated fractional and sectional views of a wall structure generally designated by the reference numeral 180. FIGURE 10 is a sectional view of the wall section 180 taken along the line 10—10 of FIGURE 9. The wall 180 comprises a plurality of foamed layers or turns 181 disposed one on top of each other in the general relationship as depicted in FIGURE 1. A plurality of skin or surface strips 182 are disposed on the surface of the foamed layers 181, each of the strips 182 defines a plurality of openings 183 adjacent one edge thereof, the openings 183 are disposed toward the upper edge of the strip 182. A lower edge 185 of the skin strip overlaps the aperture 183 permitting a foaming material to penetrate, or pass through, the aperture 183 and contact the inner surface of the lower edge 185, thereby adhering the inner skin strips 182 to each other. Similarly outer skins 187 are disposed on the opposite sides of the wall and define like apertures 188 adjacent the upper edge thereof.

Employing the embodiment of FIGURES 6, 7 and 8, a wide variety of reinforcing elements, or strips, may be incorporated into a spirally generated foam structure. The strips or skins may vary from an open mesh screen, as depicted in FIGURES 6 and 8, to a metal skin such as is illustrated in FIGURES 9 and 10. Such skins are readily prepared from fabrics of synthetic filaments, natural fibers, wire, sheet metal, flexible synthetic resinous sheet or strip such as polyethylene, nylon, polypropylene, polyvinylchloride, flexible polyesters, resin impregnated fabrics, paper and the like. Highly desirable and variable internal and external finishes are readily achieved. If desired, it is not necessary to apply simultaneously an inner and outer skin, but an inner or outer skin is readily prepared by feeding a surface finishing material from appropriate spool or supply source.

In FIGURE 11 there is schematically illustrated a cutaway view of an alternate embodiment of the invention generally designated by the reference numeral 200. The apparatus of 200 comprises in cooperative combination a frame or support means (not shown), which supports a foam depositing head 201. The head 201 comprises a mixer section 202 and a foamable material depositing nozzle 203. A head oscillating means 205 is in operative combination with the head 201 adapted to reciprocate the head transversely with respect to the direction of travel of the assembly 200. A first side forming belt assembly 207, a second side forming belt assembly 209 and a top forming belt assembly 211 are disposed and driven in a manner similar to the embodiments of FIGURES 2–8, the top assembly 211 comprises a forming belt 212, a belt support 213, a first drum 214 and a second drum 215, and a forming belt heater 216. A conduit supply means 220 is in operative combination with the foamed depositing assembly 200. The conduit supply means 220 comprises a central support mandrel 221 having a conduit 223 wound thereon, a plurality of guide and straightening rolls 224, 225, 226, 227, 228, 229, 230 and 231, guide and position the conduit 223 into a channel 235 defined by the side belt assemblies 208, 209 and the top belt assembly 211. The guide rolls 229 and 230, as well as the guide roll 231, serve to position the conduit 223 at a pre-determined location within the channel 235. A foam layer 237 is illustrated and deposited by the assembly 200 which is moving in the direction indicated by the arrow. The foam layer 237 contains a portion of the conduit 223, the foam layer 237 is bonded to a previously deposited foam layer 239 which also contains a portion of the conduit 223. Employing the apparatus of FIGURE 11 a conduit of a desired shape and size is readily disposed within a foam layer deposited by the foam depositing head and permanently embedded therein. Beneficially the conduit is preheated (by means not shown) in cases where the foamable material is not sufficiently exothermic. The conduit, beneficially, may serve as reinforcement in a structural sense as well as a conduit for heat exchange fluids, wires and the like.

In FIGURE 12 there is depicted a schematic, fractional cut-away view of an alternate embodiment of the invention, designated by the reference numeral 250. The embodiment 250 comprises an upper forming belt assembly 251 which comprises an endless belt 252 supported by a drum 253 and a drum 254. A belt heater 255 is disposed adjacent the belt 252, a belt support plate 256 is disposed within the belt 251 and adjacent the area wherein foamable material is deposited. A first side belt assembly 257 is disposed adjacent the top belt assembly 251 and is generally similar in configuration to the side belt assembly in FIGURES 2 through 8. A second side belt assembly 258 is oppositely disposed to the side belt assembly 257. The belt assemblies 251, 257 and 258 form a generally rectangular channel 260 and in combination with a previously deposited layer of foam 261 form a closed rectangular space. A foam depositing head 262 is disposed within the channel 260. The foam depositing head 262 comprises in cooperative combination a housing 263 having a foamable resinous material supply means not shown. The housing 263 defines a first foam component passageway 264, a second foam component passageway 265, a mixing chamber 266 and a foam exit port 267. A motor or mixer rotating means 269 is affixed to the housing 263 and is operatively connected to a rotatable shaft 270 passing through the housing 263 and is generally coaxial with the channel 260, a plurality of agitator blades 272 affixed to the shaft 270 are disposed within the mixing chamber 266. The shaft 270 terminates adjacent the outlet 267 in a generally discoidal rotary distributor head or slinger 274. A foamable resinous material 275 is propelled generally radially outwardly from the discharge opening 267 by the head 274. The material 275 is deposited on the surface defining the channels 260 where it foams to form a hollow generally rectangular tube of foamed material 276 which is bonded to an adjacent hollow rectangular tube of foamed material 276a. The embodiment of FIGURE 12 operates in a manner generally similar to the embodiment of FIGURES 2 through 8 with the exception that the rotary distributor or slinger 274, applies a controlled amount of foamable material to the walls of the channel defined by the belt assembly 251, 257, 258 and the previously deposited material 261 to form a hollow tube wherein each layer, or turn, of the spiral is a hollow rectangular conduit. Beneficially the embodiment of FIGURE 12 is employed when constructing the enclosures of the maximum size, wherein it is desirable to obtain as thick a wall as possible and yet utilize a minimum amount of material compatible with good engineering practice.

FIGURE 13 illustrates an alternate embodiment of the invention, generally designated by the reference numeral 280, the embodiment 280 is schematically illustrated. Much of the necessary support members and drive means and foam depositing heads have been omitted for the sake of clarity. The embodiment 280 comprises an articulated frame 281, the articulated frame comprises a first segment 282, a second segment 283, a third segment 284, a fourth segment 285, a fifth segment 286, a sixth segment 287, a seventh segment 289, an eighth segment 290 and a ninth segment 291. Each segment is connected to an adjacent segment by means of the connecting links 292, 293, 294, 295, 296, 297, 298, 299 and 300, respectively. Each of the links 292–300 is pivotally attached to the adjacent segments and adapted to pivot in a plane containing the visible surface of the segments. A top forming belt assembly 302 is disposed in such a manner that a portion of a top belt 303 passes within the segments and the links lie between the upper and lower surfaces of the top belt. A first side belt assembly 304 is disposed generally adjacent one edge of the top belt assembly 302, a second side belt assembly 306 is oppositely disposed to the first side belt assembly 304, the side belt assemblies 304 and 306 in combination with the top assembly defining channel 307, a first reinforcing strip spool 309 is disposed generally adjacent the side belt 304 and delivers reinforcing strip 310 to the outer surface of the side belt assembly 304. A second reinforcing strip supply means 313 is disposed generally adjacent the side belt assembly 306 and delivers a strip of reinforced material 314 to the side belt assembly 306. A foam depositing head is incorporated in the apparatus at a location generally adjacent the left hand portion of the figure and is adapted to deposit foam in the channel 307 generally in the manner illustrated in the previous embodiments. The forming apparatus 280 is adapted to travel in the direction indicated by the arrow.

In FIGURE 14 there is illustrated a schematic sectional representation of the apparatus 280 taken on a line 14—14 of FIGURE 13. FIGURE 14 depicts one of the segments 286, the location of the top belt 303 passing through a slot 308 defined within the segment 286. Connecting links 296 and 295 are shown pivotally attached to the segment 286. The segment 286 has pivotally supported therein a first side roller 311 and a second side roller 312. The side rollers 311 and 312 engage the first side belt 304 and the second side belt 306, respectively, and maintain it in a position to provide a rectangular cross-section of the channel 307. The rollers 311 and 312 are pivotally supported on the shafts 315 and 316, respectively.

In operation of the embodiment of the invention as depicted in FIGURES 13 and 14, foamed material is provided to the channel 307 generally in accordance with the manner employed in the previously described embodiment of the invention. The side of the top belts are driven in the appropriate direction to cause the foam depositing apparatus 280 to progress at a suitable rate along a previously prepared base material of the desired curvature. Because of the articulated construction, each of the segments 282, 283, 284, 285, 286, 287, 288, 289, 290 and 291 are free to pivot in a plane generally parallel to a panel containing a surface of the upper belt assembly. The side belts conform to a relatively small or varying radius of curvature and deposit foamable hardenable material in a channel with a generally curved configuration and a rectangular curved cross-section. The side rollers such as the rollers 311 and 312 are present in each of the segments and cause the side belts to conform to the desired configuration.

Beneficially the embodiment illustrated in FIGURES 13 and 14 is particularly adaptable for the rapid construction of spiral generated structures in that a depositing head of relatively greater length can be employed and for a given foamable, hardenable composition. The rate of deposition is proportional to the length of the curing zone which in essence is about the length of the channel defined by the forming belts in which the foamable, hardenable material is deposited.

By way of further illustration, employing a foam depositing head generally in accordance with FIGURES 2 through 5 wherein the channel defined by the forming belts is two feet in length and two inches in width and about three inches in depth. A forty-foot diameter (ground level dimension) dome is constructed utilizing a spiral generation technique employing a foamable self-extinguishing polyurethane composition which comprises a first component $a$ which is a mixture of

| Isocyanate component material: | Parts by wt. |
| --- | --- |
| Polymethylene polyphenyl isocyanate | 146.4 |
| Tris beta chloroethyl phosphate | 32.6 |
| Silicone glycol copolymer | 2.2 |

The second component $b$ comprised a mixture of an amine polyglycol which was the condensation product of 1 ml. ethylene diamine, 1 ml. ethylene peroxide and 3 mls. of propylene oxide, 71 parts by weight; trichlorofluoromethane, 47.8 parts by weight; nitromethane, 2.2 parts by weight; and N,N-dimethyl ethanol amine, 1.3 parts by weight.

The components $a$ and $b$ were fed to the foam depositing head in a ratio of 1.5 parts $a$ to 1 part of $b$ at a rate of about 0.63 pound per minute to deposit a strip of foam having a density of about 2 pounds per cubic foot and at a rate of about 0.3 of a cubic foot per minute. The foam depositing nozzle was a portion of a one-quarter inch pipe (nominal size). The components $a$ and $b$ were mixed at a temperature of about 75° C. and cured to a tack-free condition in from 15 to 20 seconds. The belts defining the channel were coated with polytetrafluoroethylene and heated to a temperature of 140° F. The linear speed of deposition was about six feet per minute. The resultant foamed polyurethane dome shows a good bonding between adjacent turns of the deposited foam and a smooth upper surface.

Sampling of the dome walls indicates that each turn of the foam strip is a generally rectangular section wherein the density of the foam increases sharply toward the outer surfaces thereby providing an element having a high modulus and excellent strength per unit weight of material deposited. In all cases low pressure (less than 10 p.s.i.) is exerted on the belts. In a manner similar to the foregoing illustration and employing an apparatus substantially as illustrated in FIGURES 6–8, a 30 foot dome was prepared employing the foamable components of the previous illustration and applying as reinforcing webs, glass fiber woven cloth having a thickness of about 10 mils and mesh openings of approximately 1/10 of an inch square. The webs are about 3½ inch in width and each web overlaps the adjacent web. Excellent bonding of the glass fiber cloth to the foam was observed. Similar beneficial results are achieved when strips of paper, cotton fabric, aluminum sheet, copper sheet, steel sheet, copper fabric, steel fabric, aluminum fabric, polystyrene sheet, polyvinylchloride sheet, polyester fabric, glass reinforced sheet are adhered to the surface of a spirally generated structure to provide reinforcement and surface decoration.

Utilizing an apparatus generally as depicted in FIGURE 11, 3/8 inch (nominal) copper tubing is disposed within a polyurethane strip having a generally square cross secional configuration and measuring about 2.75 inches per side. The tubing is warmed to a temperature of about 100° F. prior to introduction into the channel defined by the forming belts. The thermal conductivity of the copper tubing is sufficient that warming is required in order to obtain adequate curing and foaming of the resinous material adjacent the tube. In a generally similar manner ½ inch (nominal) thin wall aluminum electrical conduit is disposed within a foam structure. Utilizing an apparatus generally in accordance with FIGURE 12 spirally generated foam structures are prepared utilizing the foamable composition previously set forth to provide a hollow deposited strip of generally square cross section and measuring about 4½ inches per side. By varying foamable hardenable compositions are employed. thickness is readily varied to provide a solid foam strip having a thickness as low as ¼ of an inch.

Similar beneficial results are achieved when the following foamable hardenable compositions are employed.

Composition A

A mixture of 44.5 parts by weight of phenol, 55.5 parts of an aqueous formaldehyde solution of 37 weight percent concentration and 1.5 parts of sodium hydroxide was reacted at 60° centigrade for 6 hours. At this stage of the reaction, the liquid condensation product was water-soluble. The mixture was then acidified by addition of 33 cc. of aqueous sulphuric acid of 30 percent concentration, per pound of the mixture to which the acid was added. The acidified mixture was agitated, while warmed to about 40° centigrade for from 2 to 3 hours. The aqueous and organic layers of the mixture were separated and the organic layer was washed thoroughly with water. The water-insoluble liquid phenol-formaldehyde product thus obtained retained from 20 to 35 percent of water dissolved therein.

The resultant resin was subjected to vacuum at a temperature of about 28° C. until about 13 percent by weight of the total mixture had been removed. The weight loss is water. 20 parts of the resin are admixed with 1.8 parts of trichlorotrifluoroethane (Freon 113) and heated to 45° C. Concentrated aqueous hydrochloric acid is continuously admixed with the resin-trichloro trifluoro ethane mixture and a tack-free expanded phenolic foam is obtained 15 seconds after mixing.

Composition B 20 parts by weight of the phenol-formaldehyde resin of composition A is admixed with 1 part by weight phenol, 1.8 parts by weight trichlorotrifluoroethane. On admixture of 22.8 parts of the resin-phenol-halogenated ethane mixture with 2.5 parts of concentrated hydrochloric acid a tack-free foam is obtained 12 seconds after mixing.

Composition C

Component 1 is a liquid epoxy resin of the epichlorohydrin-bisphenol type prepared by the reaction of excess epichlorohydrin with Bisphenol A in the presence of sodium hydroxide to provide a prepolymer having an average epoxide equivalent weight of about 240, and subsequently removing the excess epichlorohydrin. The resultant prepolymer is a viscous liquid. 80 parts by weight of the viscous liquid is admixed with 19.5 parts by weight of trichloromonofluoromethane and 0.5 part by weight of a silicone glycol copolymer sold under the description of DC–113 and utilized to control the cell size of the resultant foam. Component 2 comprises 72 parts by weight of tris-2,3-dibromo propyl phosphate, 25.3 parts by weight of triethylene glycol and 2.7 parts by weight of boron trifluoride. One hundred parts of Component 1 are admixed with 7.1 parts of Component 2 and a rigid plastic foam which is tack-free is obtained 15 seconds after mixing.

Other foamable, hardenable compositions well known to those skilled in the art are useful in preparing structures in accordance with the present invention.

As is apparent from the foregoing specification, the present invention is susceptible of being embodied with various alterations and modifications which may differ particularly from those that have been described in the preceding specifications and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In an apparatus for the formation of a walled structure by a spiral generating technique which comprises in operative combination an operating head support means to position an operating head at a desired location and to succesively deposit a synthetic resinous foam material to form a walled structure, the improvement which comprises an operating head comprising a frame, the frame having a top belt, a first side belt and a second side belt, each of the belts being an endless belt, means to drive the belts at a substantially equal speed, the operating head having a first or front end and a second or rear end, the belts adapted to engage a portion of a foamed structure and propel the operating head in a forward direction, the top belt and first and second side belts defining a channel therebetween, the distance between the side belts being substantially equal to the desired wall thickness of the structure, means to provide a foamable hardenable synthetic resinous material within the channel formed by the belts.

2. The apparatus of claim 1 wherein the belts are faced with polytetrafluoroethylene.

3. The apparatus of claim 1 including means to heat the belts.

4. The apparatus of claim 1 wherein the means to provide a foamable, hardenable synthetic resinous material is a distributor adapted to oscillate across the width of the channel.

5. The apparatus of claim 1 wherein the frame is of articulate construction and adapted to pivot within a plane parallel to a face of the top belt.

6. The apparatus of claim 1 wherein the means to distribute the foamable resin is a rotating disk rotating generally about the axis of the channel defined by the belts and to thereby peripherally distribute the foamable material within the channel.

7. The apparatus of claim 1 including means to supply an adherable reinforcement to at least one side belt.

8. The apparatus of claim 1 including means to supply a conduit to the channel defined by the belts.

References Cited

UNITED STATES PATENTS

| 3,206,899 | 9/1965 | Wright | 264—32 X |
| 3,336,631 | 8/1967 | Smith | 264—47 X |
| 3,336,632 | 8/1967 | Smith | 264—47 X |

WILBUR L. McBAY, *Primary Examiner.*

U.S. Cl. X.R.

18—30; 25—1; 264—32, 47